Nov. 17, 1953 — E. F. KOERBER — 2,659,476
SUPPORTING FRAME STRUCTURE FOR CONVEYERS
Filed April 13, 1951
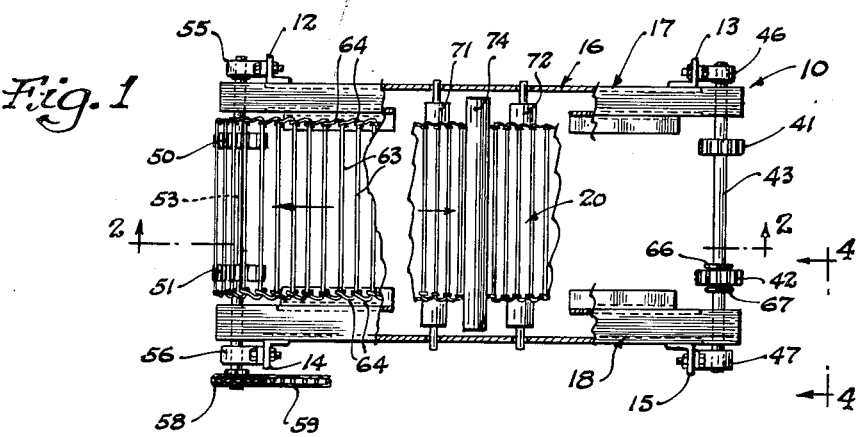
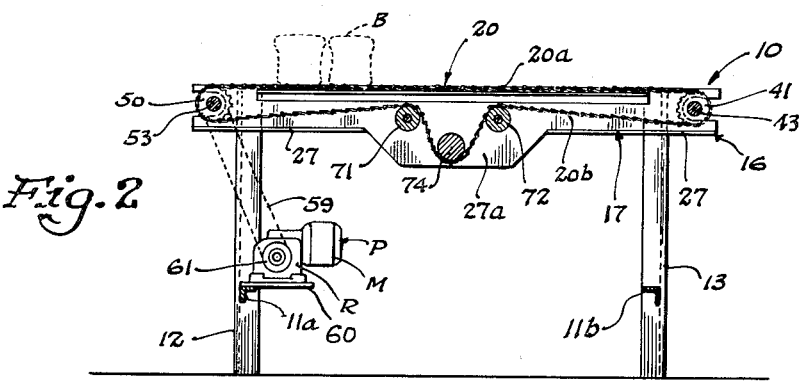
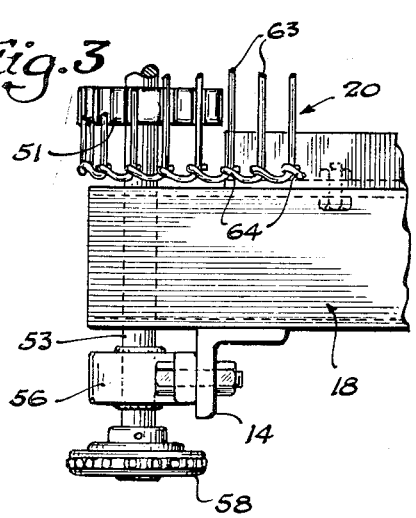
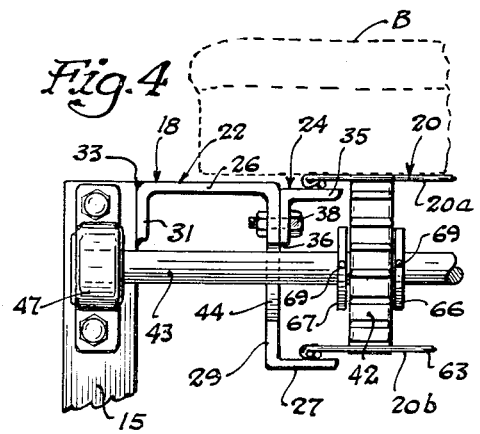
Inventor
Ernest F. Koerber
By Daniel V. O'Keeffe
Attorney Patented Nov. 17, 1953

2,659,476

UNITED STATES PATENT OFFICE 2,659,476

SUPPORTING FRAME STRUCTURE FOR CONVEYERS

Ernest F. Koerber, Chicago, Ill.

Application April 13, 1951, Serial No. 220,930

3 Claims. (Cl. 198—184)

This invention relates to conveyors and, more particularly, to conveyors of the type known in the art as belt conveyors.

It is a primary object of my invention to provide a conveyor which is particularly well adapted for use in bakeries, and the like, for conveying bread, and the like from a wrapping station to a shipping station.

Conveyors of the general nature to which my invention relates have heretofore been known in the art. However, those conveyors which have been known heretofore, have had several inherent disadvantages such as, for example, being large and bulky in construction; being of a construction which rendered them difficult to keep clean and sanitary; and being so constructed that certain parts, which were subject to wear and, therefore, to replacement, were difficult to replace. It is a further object of my invention to overcome these aforementioned disadvantages.

More specifically, it is an object of my invention to provide a conveyor of the aforementioned type which is so constructed that the passes of the conveyor belt are supported for movement in a novel and expeditious manner whereby the parts supporting the conveying pass, and which are subjected to the most wear, may be quickly and easily replaced with a minimum expenditure of time, and effort, and material.

A further object is to provide a novel conveyor which is of an open construction that eliminates substantially all dirt-catching pockets, and which conveyor may be readily kept clean and sanitary.

Yet another object is to so construct a conveyor of the aforementioned type that the conveyor belt is guided in a novel and expeditious manner.

Another object is to provide a novel conveyor which is compact, and which is particularly well adapted for use in multiple-run conveyors wherein a plurality of conveyor runs are disposed in stacked relations, one above the other. An object ancillary to the foregoing is to so construct a conveyor that access may be readily had to the conveying passes from the side thereof in a multiple-run conveyor.

Another object is to so construct a novel conveyor that loaves of bread, or similar articles, which are considerably longer than the width of the conveyor belt may be readily transported thereby and, while so transported, are supported in a novel and expeditious manner.

Another object of my invention is to provide a conveyor of the aforementioned type which is practical and efficient in construction and operation, may be readily maintained, and may be economically produced commercially.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a top plan view of a conveyor embodying the principle of my invention;

Fig. 2 is a longitudinal sectional view taken substantially along the line 2—2 in Fig. 1;

Fig. 3 is an enlarged detail plan view of a portion of the conveyor shown in Fig. 1; and Fig. 4 is a detail, end elevational view looking in the direction of the arrows 4—4 in Fig. 1.

The conveyor 10, shown in the drawings to illustrate the preferred embodiment of my invention, comprises, in general, four legs 12, 13, 14 and 15 on which is mounted a conveyor unit 16, including two parallel supporting members 17 and 18 mounted between the legs 12—15 and carrying a conveyor belt 20.

The legs 12—15 are shown in the drawings as being formed of angle-iron. However, it will be understood that any suitable uprights may be used without departing from the purview of my invention. The legs 12—15 may be braced by suitable means such as cross-rods 11a and 11b mounted between the legs 12 and 14, and 13 and 15, respectively, Fig. 2.

The supporting member 18, as best seen in Figs. 1 and 4, comprises an elongated, substantially Z-shaped bracket member 22 on which is mounted an elongated, substantially inverted L-shaped bracket member 24, the brackets 22 and 24 extending the length of the conveyor unit 16.

The bracket member 22 comprises two horizontally extending legs 26 and 27, interconnected by a vertically extending leg 29. The longitudinal free edge portion of the upper leg 26 of the bracket member 22 is bent downwardly to afford a downwardly projecting flange 31 which is attached to the legs 14 and 15 by any suitable means such as welding 33, Fig. 4, to thereby support the bracket member 22 from the legs 14 and 15 in such position that the lower leg 27 extends inwardly from the vertical leg 29 toward the legs 12 and 13 on the other side of the conveyor 10.

The inverted L-shaped bracket 24 comprises a horizontally extending leg 35 and a vertical leg 36, the vertical leg being attached to the supporting legs 14 and 15 by suitable means such as bolts 38 in such position that the upper surface of the horizontal leg 35 is disposed a short distance below the upper surface of the leg 26 of the bracket member 22 for a purpose which will be discussed in greater detail presently.

The supporting member 17 has the same parts, and is of the same construction as, the supporting member 18, it merely being necessary, when mounting the supporting member 17 on the supporting legs 12 and 13 to horizontally turn a supporting member constructed in the same manner as the supporting member 18 end for end so as to dispose the flange 31 on the outside, adjacent to the legs 12 and 13 so that the lower leg 27 of the bracket 22 of the supporting member 17 projects inwardly toward the supporting legs 14 and 15.

Two sprocket wheels 41 and 42 are mounted on a shaft 43 which extends through openings 44, Fig. 4, in the vertical legs 29 of the brackets 22 of the supporting members 17 and 18 at the tail end of the conveyor 10, Fig. 1. The opposite ends of the shaft 43 are journaled in bearings 46 and 47 mounted on the legs 17 and 18, respectively.

Two other sprocket wheels 50 and 51 are mounted on a shaft 53 at the head end of the conveyor 10, the shaft 53 likewise extending through the vertical legs 29 of the brackets 22 and being journaled in bearings 55 and 56 on the legs 12 and 14, respectively. The end of the shaft 53 journaled in the bearing 56 does not terminate therein but extends therethrough, and another sprocket wheel 58 is mounted on the end portion of the shaft 53, which extends outwardly from the bearing 56 and the leg 14.

The sprocket wheel 58 is connected by a suitable chain 59, Figs. 1 and 2, to a power unit P, including a motor M and a suitable reduction-gear unit R, mounted on a suitable base 60 on the brace 11a. The chain 59 is trained over the sprocket wheel 58 and a sprocket wheel 61 on the reduction-gear unit R.

The conveyor belt 20 which I prefer to use on my conveyor 10, is, as shown in the drawings, of the type known in the trade as a "wire-belt," comprising cross-rods or links 63 extending transversely to the length of the belt, each of the links 63 having loops 64 formed at both ends thereof by which it is connected to the next adjacent link 63, Figs. 1 and 3.

The conveyor belt 20 is of the "endless" type and is trained over the sprockets 50, 51, 41 and 42 with the links 63 disposed in the spaces between the teeth of the sprocket wheels 50, 51, 41 and 42, the links 63 being so spaced from each other that adjacent links are engaged between adjacent pairs of teeth on the sprocket wheels 50, 51, 41 and 42 during movement of the belt 20 over the sprocket wheels.

The sprocket wheels 50, 51 and 58 are secured to the shaft 53 for rotation therewith by suitable means such as keys, not shown. Similarly, the sprocket wheel 41 is keyed to the shaft 43, for rotation therewith. However, it has been found that by leaving one of the sprocket wheels on the tail end of the conveyor free to rotate on its shaft, improved adjustment of the belt 20 during operation of the conveyor 10 is effected, and, therefore, the sprocket wheel 42 is not keyed to the shaft 43 but is freely rotatably mounted thereon between collars 66 and 67, Figs. 1 and 4, which are secured to the shaft 43 by suitable means such as pins 69, and retain the sprocket wheel 42 in proper position longitudinally of the shaft 43.

The upper pass 20a, Fig. 2, of the belt 20 comprises the conveying-pass or run on which the goods to be transported by the conveyor 10 move. The lower pass 20b comprises the return pass of the belt 20.

Two idler rollers 71 and 72, Figs. 1 and 2, are journaled in the vertical legs 29 of the brackets 22 and extend transversely across the conveyor unit 16 beneath the lower pass 20b of the belt 20 in supporting relation to the latter. A counterweight or take-up roller 74 is freely mounted on the lower pass 20b of the belt 20 between the idler rollers 71 and 72 and is effective to maintain a substantially constant tension on the lower pass 20b during operation of the conveyor 10.

The conveyor belt 20 is mounted on the sprockets 50, 51, 41 and 42 between the legs 12—15 in such position that the longitudinal edge portions of the upper pass 20a adjacent the legs 12 and 13, and 14 and 15, ride on, and are supported by the upper surface of the legs 35 of the brackets 24 of the supporting members 17 and 18, respectively. In a like manner, the longitudinal edge portions of the lower pass 20b of the belt 20 ride on, and are supported by, the upper surface of the leg 27 of the bracket 22 of the respective adjacent supporting member 17 or 18, the vertical legs 29 of the brackets 22 affording effective guide members disposed at opposite sides of the lower pass 20b for restraining the latter from excessive lateral movement.

During an operation of my novel conveyor 10, the power unit P is effective, through the sprocket wheel 61, the chain 59, the sprocket wheel 58, and the shaft 53 to rotate the sprocket wheels 50 and 51 in a counterclockwise direction, as viewed in Fig. 2, to thereby advance the belt 20 in a counterclockwise direction, and cause the upper pass 20a of the belt to move from right to left, as viewed in Figs. 1 and 2.

As is best seen in Fig. 2, the central portion of the legs 27 of the brackets 22, intermediate the ends of the supporting members 17 and 18 are bent downwardly to afford a substantially straight-line extension 27a of the vertical legs 29 thereof below the ends of the idler rollers 71 and 72, to thereby afford clearance for the take-up roller 74 during any up-and-down movement of the latter, the extensions 27a also affording guide members for restricting the longitudinal movement of the roller 74 laterally of the belt 20.

As is best seen in Fig. 4, the brackets 24 are so positioned on the brackets 22 that the upper surface of the horizontal leg 35 of the bracket 24 is disposed below the level of the top surface of the horizontal leg 26 of the bracket 22 a distance substantially equal to, and preferably slightly less than, the thickness of the upper pass 20a of the belt 20. With this construction it will be seen that the upper edge portions of the vertical legs 29 of the supporting members 17 and 18 project upwardly above the top surfaces of the respective brackets 24 on each side of the belt 20 and thereby are effective to guide the upper pass 20a in a longitudinal direction. Furthermore, it will be seen that, with this construction the upper surface of the horizontal legs 26 of the brackets 22 on each side of the belt 20 afford smooth continuous sliding surfaces which form, in effect, extensions of the top surface of the upper pass 20a of the belt 20 so that articles such as, for example, wrapped loaves of bread, which are considerably longer than the width of the belt 20 may be readily transported by the belt in transversely extending position thereon, the ends of the loaves of bread, or other articles, extending out over the legs 26 of the bracket 22 as indicated in broken lines by the article B in Fig. 4.

With the top surfaces of the legs 35 of the brackets 24 disposed below the top surfaces of legs 26 of the brackets 22 a distance substantially equal to, but just slightly less than, the thickness of the upper pass 20a of the belt 20, as I prefer to construct the conveyor 10, it will be seen that the legs 26 of the brackets 22 afford effective support for the overhanging portions of an article being transported on the upper pass 20a of the belt 20, without creating undesirable drag on the article being so transported.

During an operation of my novel conveyor 10, the belt 20 is caused to rotate on the sprockets 50, 51, 41 and 42 in a counterclockwise direction, whereby articles to be conveyed thereby may be fed onto the upper pass 20a of the belt 20 at tail end of the machine (the right end as viewed in Fig. 1) and are then transported thereby to the left, as viewed in Fig. 1, and are discharged from the other, or head, end of the machine. During such operation the upper pass 20a, which is carrying the load being transported, rides on the upper surfaces of the legs 35 of the brackets 24, which are, of course, therefore subject to appreciable wear. However, with my novel construction, if the brackets 24 are worn an undesirable amount in the operation of my conveyor, they may be readily removed and replaced by removing the bolts 38, removing the worn brackets 24, inserting new brackets 24 in position on the brackets 22, and then reinserting the bolts 38 into position.

The conveyor 10, for the sake of simplicity, has been shown in the drawings, as merely a single-run machine, that is a machine having only one conveyor unit 16. However, it will be understood that this is for the purpose of illustration only and that multiple-run conveyors, embodying a plurality of such conveyor units 16 disposed one above the other, such as, for example, by mounting the other conveyor units on extensions of the legs 12—15, may be constructed by those skilled in the art without departing from the purview of my invention.

Furthermore, it will be seen that the construction of my conveyor units 16, wherein the leg 27 is disposed inwardly from the supporting flange 31, renders my conveyor units 16 especially desirable for use in such multiple-run conveyors because of the clearance afforded at the sides of the conveyor between the top pass of any conveyor unit and supporting structure of the next higher conveyor unit.

From the foregoing it will be seen that I have provided a novel conveyor which may be readily constructed and which is efficient and practical in operation.

Also it will be seen that I have afforded a novel conveyor which may be readily kept clean and sanitary.

In addition, it will be seen that I have afforded a novel conveyor wherein the conveyor belt is supported in a novel and expeditious manner.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a conveyor of the type including laterally spaced supporting means, and an elongated belt disposed between said supporting means in two substantially horizontally extending passes, two supporting members mounted on said supporting means on opposite longitudinal sides of said belt for operatively supporting the latter, each of said supporting members comprising a bracket member having a substantially upright leg, lower leg, and upper leg, said upper and lower legs extending substantially horizontally and projecting in opposite directions from said vertical leg, and another bracket member removably mounted on said first mentioned bracket member and having a supporting surface disposed on the same side of said upright leg as said lower leg in substantially vertical alignment and parallel relation to said latter leg, said supporting surface being disposed below the upper surface of said upper leg a distance substantially equal to the thickness of one of said passes of said belt, each of said supporting members being mounted on said supporting means in such position that said lower horizontal leg thereof is disposed below the adjacent longitudinal side edge portion of one of said passes in supporting relation thereto, and said supporting surface is disposed between said passes and below the adjacent longitudinal edge portion of the other of said passes in supporting relation thereto.

2. In a conveyor of the type including substantially upright, laterally spaced supporting legs, and an elongated conveyor belt disposed between said legs and having a substantially horizontally disposed upper conveying pass and a lower-return pass, two elongated supporting members mounted on said supporting legs on opposite sides of said belt and extending longitudinally therealong, said supporting members being disposed on said legs between said legs and the respective adjacent longitudinal edge portions of said belt, each of said supporting members comprising an elongated, substantially Z-shaped bracket member having an upper and a lower horizontally extending leg, and an upstanding leg interconnecting said upper and lower legs, and an elongated, substantially inverted L-shaped bracket member removably mounted on said upstanding leg, said inverted L-shaped bracket member having an upright leg disposed in juxtaposition to said upstanding leg, and a top leg projecting horizontally from the upper edge portion of said upright leg, said top leg being disposed on the same side of said upstanding leg as said lower leg in substantially vertically aligned, parallel relation to said lower leg, the upper surface of said top leg being disposed below the upper surface of said upper leg a distance substantially equal to the thickness of said upper pass of said belt, each of said upper legs being operatively connected to corresponding ones of said supporting legs so as to support the respective supporting member therefrom in such position that said top leg and bottom leg of that supporting member projects toward said belt, with said top leg disposed below said upper pass in supporting engagement therewith, and with said lower leg disposed below said bottom pass in supporting engagement therewith.

3. In a conveyor of the type including laterally spaced supporting means, and an endless belt disposed between said supporting means in two substantially parallel passes, two supporting members mounted on said supporting means inwardly of the latter and on opposite lateral sides of said belt for operatively supporting the latter, each of said supporting members comprising a bracket member having a substantially vertically disposed leg, an upper substantially horizontally disposed leg mounted on said vertical leg and projecting outwardly therefrom, and a lower substantially horizontally disposed leg mounted on said vertical leg and projecting inwardly therefrom, and another bracket member mounted on said first mentioned bracket member and having a supporting surface disposed in substantially parallel relation to said lower leg, said upper leg having a free end portion, and said first mentioned bracket members being mounted on and supported by said supporting means with said free end portions attached to the adjacent supporting means, each of said supporting members being disposed on said supporting means in such position that said lower leg and said supporting surface are disposed in supporting relation to one lateral side edge portion of a respective one of the passes of said belt.

ERNEST F. KOERBER.

References Cited in the file of this patent
UNITED STATES PATENTS

| Number | Name | Date |
| --- | --- | --- |
| 1,664,763 | Webb | Apr. 3, 1928 |
| 2,310,160 | Cohen | Feb. 2, 1943 |